United States Patent
Reichart et al.

(10) Patent No.: US 8,033,183 B2
(45) Date of Patent: Oct. 11, 2011

(54) COMPACT MAGNETIC INDUCTIVE FLOWMETER DEVICE

(75) Inventors: Walter Reichart, Fronreute (DE); Nikola Natterer, Berg (DE); Volker Schellhorn, Langenargen (DE)

(73) Assignee: IFM Electronic GmbH, Essen (DE)

( * ) Notice: Subject to any disclaimer, the term of this patent is extended or adjusted under 35 U.S.C. 154(b) by 0 days.

(21) Appl. No.: 12/533,906

(22) Filed: Jul. 31, 2009

(65) Prior Publication Data

US 2010/0180692 A1     Jul. 22, 2010

Related U.S. Application Data

(63) Continuation of application No. PCT/EP2008/051232, filed on Jan. 31, 2008.

(30) Foreign Application Priority Data

Jan. 31, 2007   (DE) .................. 10 2007 004 827

(51) Int. Cl.
    *G01F 1/58*     (2006.01)
(52) U.S. Cl. ..................................... 73/861.11
(58) Field of Classification Search ........................ None
    See application file for complete search history.

(56) References Cited

U.S. PATENT DOCUMENTS

| | | | |
|---|---|---|---|
| 3,286,522 A | 11/1966 | Cushing | |
| 3,334,518 A * | 8/1967 | Miyamichi | 73/861.12 |
| 3,839,912 A * | 10/1974 | Schmoock et al. | 73/861.12 |
| 4,497,212 A * | 2/1985 | Schmoock | 73/861.12 |
| 4,776,214 A * | 10/1988 | Moran et al. | 73/204.11 |
| 4,785,672 A * | 11/1988 | Picone | 73/861.12 |
| 5,251,149 A * | 10/1993 | Williams et al. | 702/46 |
| 5,388,455 A | 2/1995 | Hamby et al. | |
| 6,202,483 B1 * | 3/2001 | Barcus | 73/224 |
| 6,505,517 B1 * | 1/2003 | Eryurek et al. | 73/861.08 |
| 6,722,207 B1 * | 4/2004 | Feller | 73/861.12 |
| 6,752,026 B1 * | 6/2004 | Hyde | 73/861.15 |
| 6,802,223 B2 * | 10/2004 | Nakatani et al. | 73/861.12 |
| 6,832,527 B2 * | 12/2004 | Hiss et al. | 73/861 |
| 7,693,606 B2 * | 4/2010 | Ahmad et al. | 700/282 |
| 2004/0006486 A1 * | 1/2004 | Schmidt et al. | 705/1 |
| 2005/0126305 A1 * | 6/2005 | Schulz et al. | 73/861.12 |
| 2005/0193833 A1 * | 9/2005 | Huybrechts et al. | 73/861.12 |
| 2005/0229714 A1 * | 10/2005 | Willigen | 73/861.12 |
| 2009/0145656 A1 * | 6/2009 | Tschudin | 174/521 |

(Continued)

FOREIGN PATENT DOCUMENTS

DE      12 88 801       2/1969

(Continued)

OTHER PUBLICATIONS

PCT International Search Report for PCT/EP2008/051227 dated Jan. 31, 2008.

(Continued)

*Primary Examiner* — Harshad Patel
(74) *Attorney, Agent, or Firm* — Traskbritt

(57) ABSTRACT

The invention relates to a compact magnetic inductive flowmeter device, comprising a measuring tube through which the medium for measuring flows, a housing within which the measuring tube is arranged, with an analysis device which analyses a flow measurement value for the medium recorded in the measuring tube and generates an analysed signal in a standardized form therefrom which contains information about the recorded measured values.

22 Claims, 10 Drawing Sheets

U.S. PATENT DOCUMENTS

2009/0174514 A1* 7/2009 Allen .............................. 336/92
2009/0194719 A1* 8/2009 Mulligan ................. 251/129.01

FOREIGN PATENT DOCUMENTS

| DE | 15 48 918 | 10/1969 |
|---|---|---|
| DE | 44 45 591 | 4/1996 |
| DE | 198 15 463 | 10/1999 |
| DE | 198 45 346 | 4/2000 |
| DE | 698 21 474 | 12/2004 |
| DE | 103 47 878 | 5/2005 |
| DE | 103 47 890 | 5/2005 |
| EP | 0 554 059 | 8/1993 |
| EP | 1 439 438 | 7/2004 |
| GB | 2 324 606 | 10/1998 |
| GB | 2 403 016 | 12/2004 |
| JP | 58 071416 | 4/1983 |
| JP | 2002 340637 | 11/2002 |
| JP | 2005 308435 | 11/2005 |
| WO | WO 2006/045770 | 5/2006 |
| WO | WO 2008/092937 | 8/2008 |
| WO | WO 2008/092938 | 8/2008 |
| WO | WO 2008/092941 | 8/2008 |

OTHER PUBLICATIONS

PCT International Search Report for PCT/EP2008/051228 dated Jan. 31, 2008.

PCT International Search Report for PCT/EP2008/051232 dated Jan. 31, 2008.

* cited by examiner

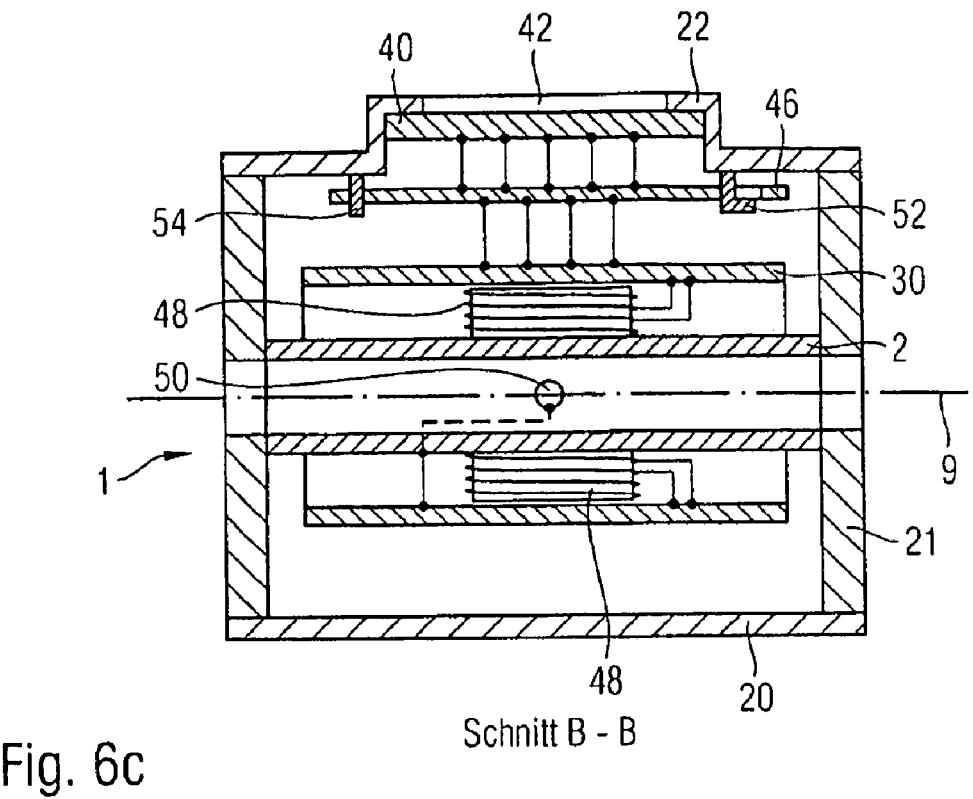
Fig. 6c    Schnitt B - B
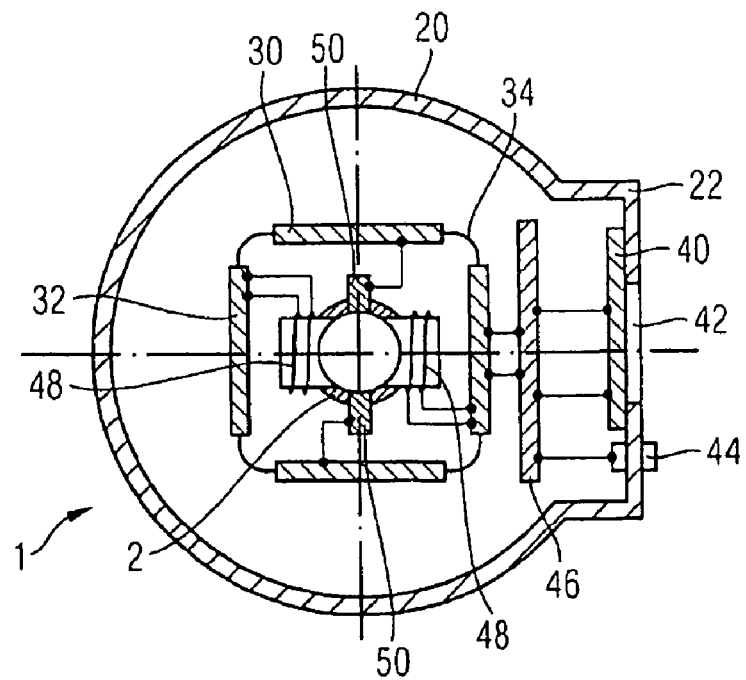
Fig. 6d    Schnitt A - A

COMPACT MAGNETIC INDUCTIVE FLOWMETER DEVICE

CROSS-REFERENCE TO RELATED APPLICATION

This application is a continuation of PCT International Patent Application No. PCT/EP2008/051232, filed on Jan. 31, 2008, designating the United States of America, published as WO2008/092941 A2 on Aug. 7, 2008, which application claims priority to German Patent Application No. 102007004827.2 filed on Jan. 31, 2007, the contents of both applications of which are incorporated herein by reference in their entirety.

DESCRIPTION

The invention relates to a compact magnetic inductive flowmeter device.

The invention relates to the field of metrology for pipelines. Such pipelines are utilized e.g. for transporting liquid or gaseous media. During the transport thereof, it is often necessary to determine the precise flow rate of the medium. This is possible using a flowmeter device that utilizes the principle of magnetic induction. In the case of such flowmeter devices, which are also designated as MID for short, the flow rate of the medium is determined through a measuring tube with the aid of a magnetic field and two measuring electrodes. During the measurement, the magnetic field permeates the electrically non-conductive measuring tube and at the same time the medium flowing through the measuring tube. If a medium containing charge carriers is permeated by a magnetic field perpendicular to its flow direction, the charge carriers are deflected by the magnetic field transversely with respect to the flow direction and transversely with respect to the magnetic field. If two measuring electrodes are situated on the tube walls, then a so-called induced voltage is dropped between them. Said induced voltage can be tapped off via the measuring electrodes and measured. The measuring electrodes are preferably oriented on the tube walls both perpendicular to the magnetic field and perpendicular to the tube longitudinal axis. In a simplified form, the following relationship then holds true:

$$U_i = k \cdot \overline{B} \cdot D \cdot \overline{v}$$

where
$U_i$ = induced voltage
k = medium-dependent constant
$\overline{B}$ = magnetic field strength
D = distance between measuring electrodes
$\overline{v}$ = average flow velocity of the medium.

It is clear from this relationship that, given a constant magnetic field $\overline{B}$ and a constant measuring tube internal diameter (distance between measuring electrodes) D, the induced voltage $U_i$ rises proportionally with increasing flow velocity $\overline{v}$ of the medium.

Generally known flowmeter devices comprise two separate device parts that are spatially separated from one another. The first device part comprises the measuring tube, the measuring electrodes and the magnetic field generating device. Here the medium to be measured flows through the measuring tube and the induced voltage is also recorded there. The second device part comprises the electronics required for evaluation and forwarding of the voltage recorded in the first device part, and also the power supply. Furthermore, the second device part has a display device, for example, which can be used to display the information obtained with regard to the flow rate.

Two different variants as to how these two device parts can be arranged in a flowmeter device are generally known:

In the first variant, the second device part is fitted to the outer side of the first device part. The overall construction of this first variant is comparatively bulky and not very compact, owing to the two device parts mounted onto one another. Therefore, use at those locations in a pipe system at which only limited space is available is not possible or is possible only with difficulty.

In the case of the second variant, the second device part is spatially separated from the first device part and connected to the latter via an external connection. What is disadvantageous about this second variant is the additional cabling outlay and assembly outlay. Furthermore, it is possible here for the measurement value to be corrupted by the use of a possibly lower-quality electrical connecting cable, damage to the cable, a long cabling path, magnetic/electrical interference fields, etc. Moreover, this second variant is more complicated and hence more cost-intensive in its production.

Magnetic inductive flowmeter devices are precision measuring devices for the linear flow measurement of liquid or else alternatively gaseous measurement media. They are typically suitable for measuring the volumetric flow rate of electrically conductive media.

In this case, such magnetic inductive flowmeter devices are very high-quality measuring devices which, on the one hand, generate a strong magnetic field and also generate heat with the requisite current flow and, on the other hand, have relatively sensitive evaluation electronics. In this case, the semiconductor components required for said evaluation electronics, and also the corresponding display units (e.g. LED, LCD displays), 35 are typically relatively temperature-sensitive. In the case of previously known solutions for MID measuring devices, therefore, a spatial separation is provided between, on the one hand, the measuring tube through which the measurement medium flows and at which the magnetic field generating device and the measuring electrodes are arranged and the evaluation electronics and the display units, on the other hand. In particular, this is required for the flow measurement of very hot media. However, the consequence of this spatial separation is that the corresponding flowmeter device is embodied in an extremely unwieldy and impractical fashion.

In addition, as a result of the spatial separation of the evaluation device and display device relative to the measuring tube with magnetic field generating device, a relatively bulky measuring device arises, which therefore also becomes susceptible to damage. Consequently, regardless of the fact of the temperature sensitivity, there is a need for a flowmeter device which is as compact as possible and which thus has a maximum mechanical robustness.

Against this background, the present invention is based on the object of providing a compact magnetic inductive flowmeter device which operates reliably.

This object is achieved according to the invention by means of flowmeter devices comprising the features of one or more of the appended claims.

Accordingly, a compact magnetic inductive flowmeter device is provided, comprising a measuring tube, through which the medium to be measured flows, comprising a housing, within which the measuring tube is arranged, comprising an evaluation device, which is arranged within the housing, evaluates a flow measurement value for the medium recorded by the measuring tube and, in a manner dependent thereon, generates in a standardized form an evaluation signal containing information about the recorded flow measurement values.

The invention is based on the concept that a spatial separation of the measurement location and evaluation device for the measurement values is not absolutely necessary for many applications. A spatial separation is used in known flowmeter devices, as explained above, since in those cases fears must be raised that the electronics of an evaluation device could be damaged by excessively high temperatures of the medium and/or vibrations of the pipe system, particularly if the evaluation device were situated too close to the measurement location. Furthermore, known flowmeter devices are used for the flow measurement of frequently critical media that are caustic or corrosive, for example. The spatial separation of the evaluation device from this critical region of the media throughflow is intended to protect the sensitive evaluation electronics from these critical media and thus to make said electronics more failsafe.

The insight of the present invention consists, then, in the fact that said spatial separation is not necessary at all in many applications. The spatial separation and the accompanying deficiencies already explained can be avoided in many applications since the medium to be measured has a low temperature, for example, at which there is no need to fear damage to the electronics in the display device. Vibrations, too, often do not occur, or occur only to a small extent, in pipe systems, such that an adverse influence on the electronics in the display device should then not be expected. Moreover, flowmeter devices are very often used for the flow measurement of media which are non-critical with regard to their chemical stability, such as, for example, water, water-like fluids, liquid foodstuffs, air, etc.

Proceeding from these insights, the invention provides a markedly compact and in addition simply constructed flowmeter device in which the measurement location and the evaluation device are not (or at least only slightly) separated spatially from one another. Furthermore, the flowmeter device according to the invention thereby also becomes very cost-effective.

The flowmeter device according to the invention contains a housing with the measuring tube comprising the measurement location, and furthermore the evaluation device for evaluating the recorded measurement values. As a result of this integration of the essential components within a single cohesive device, the overall construction of the flowmeter device becomes markedly compact and simple.

Furthermore, the flowmeter device according to the invention already comprises all the components required for the function of said device, whereby the functionality of the flowmeter device according to the invention is extended by comparison with known solutions in which only the measurement location and the magnetic field generating device are integrated within the housing. As a result, it is possible to arrange the flowmeter device according to the invention at locations in a pipeline system which are spatially very confined.

As a result of the evaluation electronics being integrated into the housing, the voltage values tapped off at the measuring electrodes are evaluated in direct proximity to the measurement location. An additional external device for evaluating these measurement values is no longer necessary here. A markedly compact construction of the flowmeter device is achieved as a result.

Such an evaluation device does not form a transmitter in the context of the present patent application. A transmitter should be understood to be a functional part for outputting and/or emitting measurement signals which emits said measurement signals for example using a wire-based or wireless connection. By contrast, a conventional evaluation device is not suitable for emitting or outputting measurement signals.

A further concept of the present invention consists in providing a compact magnetic inductive flowmeter device, comprising a measuring tube, through which the medium to be measured flows, comprising a tubular housing, within which the measuring tube is arranged, comprising an evaluation device, which is arranged within the housing, is arranged at least partly on a printed circuit board and is designed to evaluate information about the medium to be measured, said information being recorded by the measuring tube, wherein the printed circuit board has at least two printed circuit board segments which are connected to one another via flexible conductor film sections having conductor tracks.

Advantageous configurations, developments and improvements of the invention can be gathered from the dependent claims and also the description in joint consideration with the drawing.

In one preferred configuration, the evaluation device has a standardized output interface, at which the evaluation signal generated in standardized form by the evaluation device can be tapped off directly.

Said output interface is preferably a so-called PLC interface, where PLC stands for programmable logic controller. Such a programmable logic controller is an electronic assembly which is used for example in automation technology but also in metrology for control and regulation tasks. In principle, a device with specialized input and output interfaces is involved here, which device has to be embodied indeed in standardized or normalized fashion for interactive communication of the various subscribers for this controller. Instead of the use of a PLC interface, an HLC (hardwired logic controller) interface or else any other standardized interface via which the flowmeter device can communicate with other devices or communication subscribers and via which the flowmeter device can in particular also be addressed by other devices or control and programming purposes could, of course, also be used here. Instead of the use of a PLC or HLC interface, other interfaces would also be conceivable, of course, such as e.g. an I/O link interface, a field bus interface, a Profibus interface and/or an ASI interface.

In general, an analog and/or a digital current interface can be used as the output interface. Current signals in the range of between 4-20 mA are used in the case of an analog current interface. Current signals in the range of 0-16 mA or else 0-20 mA (at 0-10 volts) would also be conceivable here.

If analog voltage values are transmitted by a measurement value transmitter to a receiver via a connecting cable, they are very often corrupted. This is caused by the measurement current required for this purpose, said measurement current generating a voltage drop in the connecting line on account of the undesired line resistance. The measurement current and thus also the measurement error can be minimized by inputs having the highest possible resistance. Therefore, measurement signals are very often transmitted preferably as current signals over relatively large distances, wherein a standardized form of the transmitted current signals (e.g. 4-20 mA) is required here.

In the case of current transmission, the internal resistance and therefore the voltage drop in the connecting line play almost no part anymore. Furthermore, the current of the measurement value to be transmitted is usually sufficiently high with respect to the interference currents which are usually present and which result from a capacitive coupling. Furthermore, inductive interference signals can also be minimized in a relatively simple manner for example by transposition of the connecting line. If an analog current interface corresponding to a standard of e.g. 4-20 mA is used, it is thereby also possible for example for the measurement value transmitter to be supplied in a very simple manner since it is only necessary to provide a go and return line. A cable break can also be detected in a very simple manner.

In the case of the digital transmission of measurement signals, the presence and absence of a measurement signal is assessed as binary information instead of different voltage levels at the digital current interface.

Current interfaces are often also referred to as current loop interfaces and serve, in particular, to ensure information transmission in a harsh environment, in the case of which interfaces high interference levels that are superposed on the signal to be transmitted can be expected. In the case of such current interfaces and the corresponding information transmission, the transmission of the information is still ensured even when there are relatively high interference signals present on a connecting line which no longer satisfactorily ensure an otherwise customary transmission by means of voltage levels. In the simplest case, with a current interface, the transmitter or measurement value transmitter of the signal to be transmitted is an adjustable current source and the receiver comprises a low-resistance terminating resistor (the so-called shunt resistor), at which the measurement current is determined by means of the voltage drop. The 20 mA current loop interface is standardized according to DIN 66258. It operates with a maximum no-load voltage level of 24 volts.

In a first configuration, the evaluation device is designed to provide an analog evaluation signal at the output interface. This is expedient particularly in the case of an output interface embodied as a PLC interface since the input or output signals for the flowmeter device are present in analog form there. By way of example, in the case of an output interface embodied as a PLC interface, the evaluation device is designed to provide on the output side an analog current signal in the range of approximately 4 to 20 mA and/or a voltage signal in the range of approximately 0 to 10 V. Other current/voltage ranges would also be conceivable, of course, for the analog evaluation signal provided on the output side, this also being dependent, in particular, on which standardized output interface is provided in the specific case of application.

In a further configuration, alternative thereto, the evaluation device is designed to provide a digital evaluation signal at the output interface. Said digital evaluation signal contains the respective information about recorded flow measurement values preferably in binary coded form. In particular a binary code or a BCD code is suitable as the binary code. Any other coding, for example a hexagonal code or a thermometer code, could also be used, of course, instead of the use of a binary code for communicating the flow information of the evaluation signal about the flow.

In one preferred configuration of the invention, the evaluation device provides a frequency-modulated or amplitude-modulated evaluation signal at the output interface. However, a different form of communicating information, for example by means of a pulse-width-modulated evaluation signal, would also be conceivable here.

In an alternative configuration, the evaluation signal directly comprises the flow measurement value, In the case of a digitally coded evaluation signal, for example, here the information about the flow measurement value would be coded directly in the digital evaluation signal. As an alternative, however, it would also be conceivable for the evaluation signal to contain information derived from the flow measurement value. This is advantageous particularly when specific correction factors are used for the flow which for example take into account the geometry and fashioning of the measuring tube in the region of the measurement location, take into account the flow characteristic of the medium to be measured (for example turbulent flow or linear flow) or for instance also take into account the influence of the tube diameter and the tube walls on the flow. For determining said correction factor it is possible for example to have recourse to other measuring methods, empirical values, estimates and the like.

In one configuration of the invention, the evaluation signals contain direct information or information derived therefrom about the flow rate, the flow velocity, the medium itself flowing through the measuring tube, the temperature of said medium, the strength of the magnetic field generated by means of the magnetic field generating device, and/or the set parameters of the flowmeter device. However, further information such as, for instance, the fashioning of the measuring tube itself, in this case in particular the measurement cross section thereof, the materials contained in the measuring tube, etc. would also be conceivable here.

In one typical configuration, the evaluation device contains integrated evaluation electronics. Said integrated evaluation electronics preferably furthermore contain a program-controlled device. Such a program-controlled device or the evaluation electronics can be embodied for example as a microprocessor or as a microcontroller. A digital signal processor (DSP) would also be conceivable here, of course. In addition or as an alternative, the evaluation functionality can also be realized by a hardwired logic circuit, which is preferably also embodied in programmable fashion. Such a logic circuit can be embodied for example as an FPGA or PLD.

This integrated configuration of the evaluation electronics, in the case of which, therefore, the various elements of the evaluation electronics are integrated in a semiconductor material, is particularly expedient and advantageous in the case of very large numbers of the flowmeter device.

In the case of small numbers it is advantageous to provide the components required for the evaluation electronics as discrete components which are arranged on a printed circuit board of the evaluation device, said printed circuit board being provided specially therefor, are contact-connected there and are electrically connected via corresponding conductor tracks and connecting lines.

In one particularly preferred configuration, the evaluation device and here in particular the program-controlled device thereof is embodied in programmable fashion. In this way, the program of said program-controlled device can also be subsequently altered, for example by control commands also being subsequently coupled into the evaluation device externally via the plug connection and hence the external interface. In this way, the program of the evaluation device can be adapted in a targeted manner to the respective application and in this case in particular to the medium to be measured and the ambient conditions and can be altered.

In one likewise preferred configuration, the evaluation device and here for example the program-controlled device thereof contains a storage device. Said storage device preferably contains characteristic data about the measuring tube and in particular with regard to the dimensions and properties of the measuring tube which are relevant to the flow measurement. Here, consideration can be given in particular to the dimensioning and fashioning of the measurement cross section in the region of the measuring electrodes at which the flow measurement values are tapped off in the form of the induced voltage. In addition or as an alternative, however, said storage device can also be arranged outside the evaluation device, thus for instance in the vicinity of or even within the measuring tube. However, the solution for integrating the storage device into the evaluation device, and there in particular into the program-controlled device thereof, constitutes probably the most effective and simplest possibility.

In one preferred configuration, the evaluation device and here in particular the evaluation electronics thereof are at least partly arranged on a printed circuit board.

In a first configuration, the printed circuit board is embodied such that it is partly flexible. Such a partly flexible printed circuit board is often also referred to as a semi-flex printed circuit board. As an alternative, —it would also be conceivable for the printed circuit board to be embodied such that it is fully flexible. Such a fully flexible printed circuit board is often also referred to as a rigid-flex printed circuit board or as a flexible conductor film.

By virtue of a partly flexible printed circuit board, the evaluation electronics can at least partly be folded together. This foldability can be utilized in order to arrange the evaluation electronics in a limited space within the housing. Since a small space requirement is therefore needed for the evaluation electronics, the housing of the flowmeter device can likewise be embodied very compactly. The advantage of such a flexible printed circuit board therefore consists in the fact that the latter can to a certain extent be fully adapted to a predetermined housing form of the flowmeter device and can preferably nestle very closely for example against the inner wall of the housing or for instance also against the measuring tube, assembly being facilitated by the cohesion of these flexible printed circuit boards. Consequently, a very compact embodiment of the construction of a flowmeter device is possible here in the case of integration of the evaluation device within the housing of the flowmeter device.

In a configuration alternative thereto, the printed circuit board has e.g. merely a single and preferably at least two printed circuit board segments. In contrast to the flexible printed circuit boards as mentioned above, such printed circuit board segments are rigid, that is to say embodied in inflexible fashion. With such rigid, inflexible printed circuit board segments, the form thereof cannot be altered, with the result that these printed circuit board segments (unlike the flexible printed circuit board) inherently cannot be bent within the housing of the flowmeter device.

In one preferred configuration, in the case where the printed circuit board has at least two printed circuit board segments embodied in inflexible fashion, said segments are connected both mechanically and usually also electrically to one another via flexible conductor film segments or other flexible connecting means. By virtue of this construction of the printed circuit board, electronic components can be arranged on a plurality of rigid, inflexible printed circuit board segments, wherein the printed circuit board can be folded by means of the flexible conductor film segments. This foldability is utilized for arranging the evaluation device onto the measuring tube of the flowmeter device in such a way that the printed circuit board at least partly encloses the measuring tube in a radial direction. A more or less compact overall construction of the flowmeter device is possible as a result of this arrangement.

In one particularly preferred configuration, at least one of the printed circuit board segments is embodied as a so-called multilayer printed circuit board. Such a multilayer printed circuit board has a multiplicity of different layers, wherein, according to the invention, at least one of said layers of the multilayer printed circuit board is embodied in electrically conductive fashion. In one preferred development, said multilayer printed circuit board has an electrically conductive shielding device, by means of which undesirable interference signals coupled in externally, for example, or else, for instance, interference signals caused by the components of the evaluation device can be effectively shielded and e.g. do not adversely influence the further elements of the evaluation electronics or of the evaluation device. Preferably, at least one of the layers of the multilayer printed circuit board also has a conductor track via which signals, e.g. measurement signals, control signals, data signals, etc., can be conducted between the components of the evaluation device. For this purpose, use is preferably made of an inner layer of the multilayer printed circuit board which is protected, against mechanical stress, for example, toward the outside at least by means of a further layer of the multilayer printed circuit board.

In one particularly preferred configuration, the flexible sections of the printed circuit board and/or the flexible conductor film sections present between two printed circuit boards segments embedded in inflexible fashion likewise have conductor tracks. In this way it is possible to exchange signals between two printed circuit board segments, such that the elements of the evaluation electronics can be distributed over a plurality of printed circuit board segments or sections of the printed circuit board and can nevertheless communicate with one another.

In a configuration alternative thereto, the printed circuit board is embodied as a continuous printed circuit board and nevertheless has at least two printed circuit board segments. Here, grooved incisions and/or thinned portions in the printed circuit board are provided in each case between two adjacent printed circuit board segments in such a way that, at the location of said grooved incisions and/or thinned portions of the printed circuit board, the latter is embodied in flexible fashion and can thus bend, in contrast to the remaining regions of the printed circuit board. By virtue of this embodiment of the printed circuit board, too, the latter can at least partly enclose the measuring tube in a radial direction, whereby a markedly compact internal overall construction of the flowmeter device can be achieved in this case as well.

In a first configuration, the printed circuit board and/or the printed circuit board segments thereof at least partly encloses the measuring tube in the radial direction thereof. Here the printed circuit board is therefore fixed to the measuring tube. In a configuration alternative thereto, the printed circuit board and/or the printed circuit board segments thereof nestle against an inner surface of the housing jacket.

In one particularly preferred configuration, at least two of the printed circuit board segments and preferably all of the printed circuit board segments are arranged around the measuring tube at an angle of 90° with respect to one another by means of flexible printed circuit board sections. Preferably, in this case a total of four printed circuit board segments are provided, even though just two or three printed circuit board segments would also be conceivable. In the case of four printed circuit board segments, the latter completely enclose the measuring tube, whereby the measuring tube also acquires a certain encapsulation and hence a mechanical protection for the measuring tube and the magnetic field generating device fixed thereto. Furthermore, the printed circuit board segments and the evaluation device provided thereon are thereby also fixed, which is likewise advantageous in terms of assembly technology.

A larger number of printed circuit board segments arranged around the measuring tube would also be conceivable there of course, in which case it would likewise be advantageous for said segments to completely enclose the measuring tube in a radial direction. Furthermore, it would also be advantageous to provide just two or three printed circuit board segments arranged around the measuring tube at an angle of 60° with respect to one another by means of flexible printed circuit board sections. These then form to a certain extent a cross-sectional triangular encapsulation, which should likewise be preferred for stability reasons, for reasons of assembly technology and for the sake of better protection.

In one likewise preferred configuration, the printed circuit boards and/or the printed circuit board segments thereof are aligned in the axial direction of the measuring tube, that is to say in the flow direction of the medium to be measured, and thus in the longitudinal direction of the housing of the flowmeter device. This likewise affords advantages in terms of assembly technology.

In one preferred configuration, the flowmeter device according to the invention has a display device for directly displaying the flow information provided by the evaluation device. Said display device is preferably arranged directly in the housing or alternatively fitted to the housing. In this way, in contrast to known solutions, not only is it possible to obtain information about the flow of the medium, in this case in particular the flow velocity and the flow rate, and to provide it in standardized form. Rather, in contrast to known solutions, said information obtained can also be displayed directly on the compact flowmeter device, which constitutes a very elegant and convenient solution for a user.

In one preferred configuration, the display device has a screen, for example an LCD, or a display. Said screen and the display, respectively, are designed to display the measurement values or the flow information derived from said measurement values.

For accommodating said screen or display, the housing has a first cutout, in which the screen display is arranged in integrated fashion. Preferably, a covering sheet is furthermore applied in said cutout, and serves to protect the screen or display against external influences, and in this case in particular against mechanical stress, particles and the like.

The display device preferably displays the flow information in digital form. The value of this digital evaluation signal can then be represented on the screen or on the display. An analog display would also be conceivable here, of course, even though a digital display makes it easier in many cases for the observer to take up the information. The conversion of a voltage change into a pointer deflection in the case of an analog display can be realized technically in a very simple manner. Furthermore, a digital display affords the advantages, inter alia, that the display can be read very easily and, moreover, a plurality of measurement values can also be represented simultaneously. For the case of a digital display device, the evaluation signals that are ready at the output interface should be present in digital form. If said evaluation signals are present in analog form, however, then at least one analog-to-digital converter would furthermore have to be connected upstream of the display device, said converter performing an analog-to-digital conversion of the analog evaluation signal into a digital evaluation signal.

In one preferred configuration, the evaluation device is electrically conductively connected to the display device by means of a connecting line, for example. It would also be conceivable, however, for the evaluation device to be coupled to the display device via radio or optically.

The flowmeter device furthermore preferably has an operating device, which is embodied as a keyboard, in particular, and which is integrated directly into the housing of the flowmeter device. Such an operating device enables the user to interface with the flowmeter device. Thus, by way example, it is possible to select which measurement values are intended to be displayed. Furthermore, it is possible to instigate the display of operational parameters of the flowmeter device that have been selected by means of the operating device, or to set said operational parameters manually.

In one preferred configuration, the operating device has at least one second cutout in the housing, operating elements, for example a keyboard or a switch, in each case being arranged within said at least one second cutout. This arrangement ensures that the operating elements are easily accessible externally and operation is thus possible in a simple manner. These operating elements are touch-sensitive elements, for example, upon the actuation of which a control signal is generated by means of a touchpad assigned specially to this operating element. In a minimal variant, the operating device has a single operating element, by means of which, however, typically just a small number of mutually differing inputs can be effected. However, the operating device can also have a very comprehensive keyboard by means of which a plurality of numbers and/or letter inputs are possible. In this case, in particular, it would also be possible, for example, to input control commands into the operating device externally. In addition or as an alternative, the flowmeter device could also be programmed by means of the operating elements.

In a further configuration, in the region of the first inner side of the housing the operating device can be flowmeter device by means a fixing device is provided and/or second cutout on an The display device and/or fixed to the housing of the of said fixing device. In this way, the operating device and/or the display device is fixed and cannot move from the housing even in the event of vibrations, an external mechanical effect or the like. The fixing device is particularly preferably embodied as a plug, clip and/or latching-in device. These embodiments of the fixing device furthermore enable particularly simple and rapid mounting of the display device and/or of the operating device during the production of the flowmeter device. Furthermore, undesired slipping of the display device and operating device in the flowmeter device is prevented in this way.

The display device and/or the operating device and/or the evaluation device are furthermore preferably arranged on a common printed circuit board. Such an arrangement of the function of a plurality of drive devices on a common printed circuit board permits the latter to be embodied significantly more compactly than would be possible if these devices were provided on a plurality of separate printed circuit boards. In addition, it is significantly more economical to populate only one circuit board with electronic components and to provide it with conductor tracks than mounting the components on a plurality of different printed circuit boards. Furthermore, here it is also necessary for only one printed circuit board to be integrated into the housing, whereby the assembly outlay is thus reduced.

In a further configuration, the display device and/or the operating device are arranged on a printed circuit board separate from the printed circuit board of the evaluation device. Preferably, however, the display device and/or the operating device or the printed circuit boards thereof are at least electrically connected to the printed circuit board of the evaluation device, such that evaluation signals provided by the evaluation device can be fed to the display device and, conversely, inputs that have been input by the operating device can be taken into account by the evaluation device.

In a further preferred configuration, at least one plug connection is provided on the housing of the flowmeter device. Control signals can be coupled into the flowmeter device externally via said plug connection. By way of example, via said plug connection, a programming of the flowmeter device and in particular a programming of the evaluation device thereof can also be performed from outside the flowmeter device. In addition or as an alternative, it is also conceivable for control and evaluation signals to be tapped off from the flowmeter device externally via said plug connection. It would be conceivable, for example, for the evaluation signals determined by the evaluation device or signals derived therefrom to be passed out of the flowmeter device via the plug connection and be taken for example by an electronic device provided externally at the flowmeter device. Since said evaluation signals are ready in standardized form here, it is merely necessary to ensure that the respective electronic device which taps off this control and evaluation signal generated by the flowmeter device has a corresponding standardized interface for taking up these standardized control and evaluation signals.

In one preferred configuration, the plug connection is embodied as a socket in which a plug can be plugged from outside. Said socket is preferably embodied as a so-called M12 socket or M8 socket serving to receive an M12 plug or m8 plug, respectively. Such a socket typically has an external thread, on which an internal thread of the M12 plug or M8 plug can be screwed, whereby a very secure, vibration-imperceptible plug and socket connection is provided. The particular advantage when using such M12 and M8 sockets and corresponding plugs is that the flowmeter device can communicate in this case directly with known field bus systems, without any adaptation of the interface having to be made. The particular advantage also consists here in the fact that standard components that are also present in other subscribers can be used in the flowmeter device and an adaptation of the various subscribers in the field bus system is thus possible in a simple manner.

In one preferred configuration, the plug connection has three connection pins. It is particularly preferred for the plug connection to have four connection pins. It would also be conceivable, of course, for the plug connection to have more than four or else only two connection pins.

In the case of the exemplary embodiment having three connection pins, a first connection can have a first supply potential, for example the positive supply potential, a second connection can have a second supply potential, for example a negative supply potential or the reference ground potential, and a third connection can be provided for the switching output.

In the particularly preferred exemplary embodiment wherein four connection pins of the plug connection are provided, the fourth connection can be embodied as an analog connection. Said analog connection can preferably be utilized for control functions of the flowmeter device, for example by control and programming commands being coupled into the flowmeter device externally. In addition or as an alternative, control and evaluation signals can also be coupled out from the flowmeter device via said fourth connection, which signals can then be processed further by other subscribers in the communication system.

Preferably, the plug connection is connected to the housing by a resistance welding connection or is alternatively arranged fixedly in a sleeve that is specially provided therefor and is resistance-welded to the housing.

In one preferred configuration, the flowmeter device has at least one supply connection on the housing via which the flowmeter device can be supplied with power externally.

In one particularly preferred configuration, the flowmeter device has just a single external connection, which has both the function of the supply connection for the power supply of the flowmeter device and the plug connection for coupling control and evaluation signals in/out.

Instead of the evaluation signals generated by the evaluation device being coupled out via the plug connection, in an alternative configuration it is also possible for said evaluation signals to be displayed directly by means of the display device. In this case, the output interface of the evaluation device within the housing is directly coupled to the display device. Such a coupling can be carried out for example by means of a connecting line specially provided therefor or else alternatively by means of an optical coupling or a radio coupling.

The flowmeter device furthermore preferably has a magnetic field generating device. By means of the magnetic field generating device, a magnetic field can be generated which permeates the measuring tube for the purpose of measuring the flow of the medium.

The measuring device furthermore preferably has two measuring electrodes arranged perpendicular to the magnetic field and/or perpendicular to the flow direction of the medium. It is advantageous for the measurement if the magnetic field, the flow direction of the medium and the measuring electrodes are oriented possibly perpendicular to one another. On account of vibrations, interference voltages and the like, this usually cannot be set exactly. It is therefore expedient for the induced voltage, representing the flow rate, to be significantly greater than a possible interference voltage, in order to enable better differentiation of the voltage values. This can be set by means of the magnetic field that is coupled in.

In one preferred configuration, the measuring tube has guide means for holding and positioning the magnetic field generating device in the region of a measurement cross section of the measuring tube. In one preferred configuration, the guide means are embodied as guide rails in which the magnetic field generating device can be displaceable perpendicular to the measuring tube and/or can be arranged perpendicular to the measuring electrodes. In this case, the magnetic field generating device is preferably arranged between the guide means.

In one preferred configuration, the guide means are integrally formed or integrally injection-molded onto the measuring tube in one piece. In addition or as an alternative, the guide means can be fixed to the measuring tube by fixing means, in particular a screw, clamping, latching-in and/or plug-in device.

The guide means preferably have at their longitudinal ends in each case first positioning elements, which serve for positioning and/or fixing the measuring tube on a printed circuit board and/or on the printed circuit board segments thereof. Said printed circuit board can preferably be the printed circuit board which encloses the measuring tube and which contains the evaluation device.

The measuring tube preferably has second positioning elements, which are oriented orthogonally relative to the first positioning elements and which serve for positioning and/or fixing the measuring tube on a printed circuit board surrounding the measuring tube and/or on the printed circuit board segments of said printed circuit board. The second positioning elements, arranged orthogonally with respect to the first positioning element arranged at the longitudinal ends of the guide means, can be for example the measuring electrodes fitted to the measuring tube, or at least be connected to said measuring electrodes. In this case, it is particularly preferred for said second positioning elements to be soldered as soldering pins directly to a corresponding connection pad on the printed circuit board.

The first and/or the second positioning elements can be embodied for example as positioning lugs. With the use of such positioning elements, the corresponding printed circuit board on which the evaluation device is fitted can be arranged around the measuring tube and fixed there in a very simple manner.

In one typical configuration, the measuring tube has two measuring electrodes arranged on the measuring tube in a manner lying opposite one another and perpendicular to a magnetic field that can be generated by the magnetic field generating device and/or perpendicular to the flow direction of the medium to be measured.

Said measuring electrodes are preferably electrically connected to the evaluation device. This is preferably effected directly by using the measuring electrodes as soldering pins that are soldered directly to corresponding connection pads of the printed circuit board on which the evaluation device is as it were also arranged.

In one preferred configuration, the measuring tube comprises an electrically insulating material, in particular an injection-molded plastic, a glass and/or a ceramic material. Since the magnetic field has to permeate the tube wall of the measuring tube, the measuring tube is not permitted to be ferromagnetic since such a measuring tube would significantly attenuate the magnetic field and would additionally result in a non-reproducible alignment of the field lines of the magnetic field.

Owing to the complex geometry of the measuring tube, it is particularly advantageous to use a plastic as material for the measuring tube. Particularly in the case of measuring tubes produced by the injection molding method, it is possible in this way to produce complicated geometries in a comparatively simple manner. A polymeric material such as PEEK (PEEK=polyether ether ketone) is preferably used here for the measuring tube. PEEK is a thermoplastic that is resistant to high temperatures and has its melting point at approximately 335° Celsius. Instead of using PEEK, it is also possible to use other ketones such as, for example, PEK, PEEEK, PEEKEK or PEKK. Such polyether ketone materials are resistant to almost all organic and inorganic materials. Furthermore, these materials are also advantageous because they are resistant to hydrolysis up to a temperature of approximately 280° Celsius. However, such materials are typically not resistant to UV radiation and caustic materials or under oxidizing conditions, as a result of which such polyether ketones have to be protected by a housing specially provided therefor.

To summarize, it can thus be established that PEEK has a markedly good chemical and thermal resistance by comparison with other plastics. As a result, it is possible to use a measuring tube equipped with such a material even in the case of aggressive flow media with a high temperature. It is furthermore preferably the case that PEEK is preferably used on account of its high strength and stiffness.

In one preferred configuration, the housing has a seamlessly drawn or welded (e.g. longitudinally welded) tubular housing jacket, which encloses at least the measuring tube and/or the display device and preferably also the operating device and/or the evaluation electronics. Such an integral tubular housing jacket is markedly economical since there is no need for any additional connecting techniques for producing the housing. Expensive and primarily also heavy cast housings are therefore not necessary. The housing jacket furthermore preferably has a circular or polygonal base surface. A housing jacket having a circular base surface can be produced particularly simply by the deep-drawing method. However, a housing jacket having a square base surface is also likewise advantageous. A tubular housing jacket having a square base surface has a particularly high vibration resistance. Instead of using seamlessly drawn and longitudinally welded housing jackets, the latter can of course also be produced in a different way; by way of example, housing jackets produced by the deep-drawing method can be provided.

In a likewise particularly preferred configuration, at least one threaded connector cover and preferably precisely two threaded connector covers are provided, by means of which the housing can be closed off toward the outside. Said threaded connector covers are typically fitted to the housing jacket of the housing on both sides and for this purpose have joining methods by which they can be fixed to the housing jacket and/or to the measuring tube.

Said threaded connector covers can preferably be welded onto the housing jacket. In this case, the weld seam between threaded connector cover and housing jacket forms the respective fixing means. This is particularly preferred since the threaded connector cover is in this way fitted to the housing jacket in a pressure- and torsion-resistant manner. The welded connection provided here can be a conventional V weld seam or square butt weld seam or else alternatively a through-welded connection. Instead of using a welding connection as fixing means, it is also possible here to provide an embossing connection, a press fit, a press connection, a screw connection or the like.

In one particularly preferred configuration, an interference fit is provided, in the case of which of which the threaded connector cover is press-fitted into the housing jacket at high pressure, the threaded connector cover in this case having an oversize with respect to the corresponding housing jacket. By virtue of the fact that said threaded connector cover is then press-fitted into the housing jacket at high pressure, this results in an extremely stable connection formed in both air-tight and torsion-resistant fashion between threaded connector cover and housing jacket.

The through-welded is preferably employed for tolerance compensation on one side of the flowmeter device. One preferred variant of through-welding is laser welding. Independently of this, other welding methods, such as resistance welding, are also appropriate.

The housing and/or the threaded connector cover furthermore comprises a metal, in particular a high-grade steel, and is preferably completely produced from said metal. Since metals, and in particular high-grade steels, have a high strength, stiffness and toughness, forces that act on the flowmeter device in the event of possible expansion and contraction of the pipeline are absorbed well by the metal housing without damage occurring in the flowmeter device. In the case of the embodiment composed of high-grade steel, the housing is also particularly corrosion-resistant.

In one preferred configuration, the flowmeter device furthermore has at least one temperature sensor, preferably fitted directly to the measuring tube. Firstly, simple monitoring of the temperature of the measuring tube and, in particular, also a measurement of the temperature of the medium flowing through the measuring tube are possible as a result. If a limiting temperature is exceeded which could lead to damage to the measuring tube, it is thus possible to implement countermeasures without delay. This is particularly advantageous because metallic measuring electrodes have a very high thermal conductivity and the temperature can thereby be detected precisely. The measurement signals of said temperature sensor can likewise be evaluated directly in the evaluation device and be displayed directly for example by means of the display device. In one preferred configuration, the functionality of said temperature sensor is implemented to a certain extent in the measuring electrodes.

In one preferred configuration, the flowmeter device is embodied as a heat quantity display device. This heat quantity display device determines, from the flow of the medium flowing through the measuring tube, the heat of said medium and correspondingly integrates said heat. The heat quantity of the medium flowing through the measuring tube is obtained therefrom, and is provided in the evaluation signal. Preferably, said heat quantity is displayed by means of the display device in a corresponding manner directly on the flowmeter device.

In one particularly preferred configuration, the flowmeter device is embodied as a DC voltage device, and here in particular as a 12-volt or 24-volt DC voltage device. The embodiment of the flowmeter device as a DC voltage device is advantageous in particular because it is thereby possible to provide an overvoltage protection for the flowmeter device, and in particular for the medium flowing through the measuring tube. Known flowmeter devices are typically embodied as AC voltage devices, for example as 110- or 220-volt AC voltage devices. The implementation of the same functionality by means of such an AC voltage device is significantly more complex.

In one particularly preferred configuration, the flowmeter device embodied as a DC voltage device has a voltage converter, which is typically part of the evaluation device. Said voltage converter is designed to convert the DC voltage supply coupled in externally, for example, into an AC signal. The voltage converter used can be for example a simple boost converter or buck converter. Further voltage converters would also be conceivable, of course, which are chosen in a suitable manner depending on their application.

In one preferred configuration, the housing jacket embodied in tubular fashion is oriented in a longitudinal direction of the flowmeter device. Said longitudinal direction of the flowmeter device is defined by the axis of the measuring tube and thus by the flow direction of the medium flowing in the measuring tube. In the case of a cylindrical, tubular housing jacket, therefore, the cylinder is oriented rotationally symmetrically along said longitudinal direction.

A length of the housing jacket is preferably defined by the axial extent thereof. In this case, the housing jacket typically has over its entire length substantially an identical, constant cross-sectional area. This cross-sectional area or else base surface is formed by a section through the housing jacket perpendicular to the axis of the housing jacket. Preferably, the housing jacket has a ratio of its length to diameter in the range of 1.5:1 to 3:1, and preferably of 2:1. Owing to this very small ratio of the length to the diameter of the housing, a very compact flowmeter device is provided which can be installed even at spatially particularly restricted locations such as e.g. between two pipe bends. An even more elongate form, rather, of the flowmeter device or of the housing jacket thereof or else, for instance, an even more compact, shorter design of the flowmeter device or of the housing jacket thereof would also be conceivable, of course.

In one particularly preferred configuration, the housing jacket is embodied in cylindrical fashion at least in sections. A prismatic embodiment of the housing jacket at least in sections would also be conceivable. In one particularly preferred configuration, the housing jacket is embodied completely in cylindrical or prismatic fashion. This is particularly preferred in particular because such tubular housing jackets can be produced in a very simple manner, with the result that the corresponding flowmeter devices can thus also be assembled in a very simple and cost-effective manner. In particular, the production outlay for the housing jacket is thus significantly reduced since the housing jacket can be cut in a very simple manner from a tube of greater or lesser length or can be produced e.g. by deep-drawing or other similar methods.

In one typical configuration, the housing jacket is embodied in integral fashion. In this context, integral means that the housing jacket is produced from a single part, that is to say without welding, screwing and the like, as is the case e.g. for production from a tubular part. As has already been explained above, the flowmeter device can be equipped with further functional units such as e.g. a display device, an operating device and a socket. In this case, the housing jacket is nevertheless embodied in integral fashion with the exception of a socket, display device, operating device and the like possibly integrated in the housing jacket.

In one particularly preferred configuration, the housing jacket has an opening in each case on both sides, wherein the cross-sectional areas of the openings substantially correspond to the cross-sectional areas in the remaining region of the housing jacket along the longitudinal axis thereof. The housing jacket thereby has an approximately ring-shaped base surface relative to its cross section. In one configuration alternative thereto, the housing jacket has a polygonal, in particular triangular, quadrangular, rectangular, hexagonal or octagonal cross-sectional area. A cross-sectional area deviating therefrom, for example a cross-sectional area having a different number of sides or else, for instance, an oval cross-sectional area, would also be conceivable, of course.

In one preferred configuration, the housing jacket comprises a metal having the best possible thermal conductivity, in particular a high-grade steel, and is preferably produced completely from said metal. Since noble metals and in particular high-grade steels have a high strength, stiffness and toughness, forces that act on the flowmeter device in the event of possible expansion and contraction of the pipeline are optimally absorbed by the housing without damage to the flowmeter device occurring. Instead of using a housing composed partly of metal, said housing can also be composed of a metal alloy provided that said metal alloy is likewise embodied with the best possible thermal conductivity. This thermal conductivity of the housing makes it possible to ensure that, by way of example, heat generated in the interior of the housing by means of the magnetic field generating device or else for instance by means of a hot flow medium that emits heat to the housing, said heat is emitted very rapidly to the surroundings of the flowmeter device. As a result, the flowmeter device does not heat up or heats up only very slowly, which is advantageous in particular for the display device and the evaluation device. Furthermore, this is also preferred for the measurement sensitivity of the flowmeter device.

The invention is explained in more detail below on the basis of exemplary embodiments with reference to the accompanying figures in the drawings, of which:

The invention is explained in more detail below on the basis of the exemplary embodiments indicated in the figures in the drawing, in which:

FIGS. 6A-6D show the flowmeter device 1 according to the invention in a further preferred exemplary embodiment;

In the figures in the drawings, the same reference symbols designate identical or functionally identical elements and components, unless indicated to the contrary.

Figure 1:
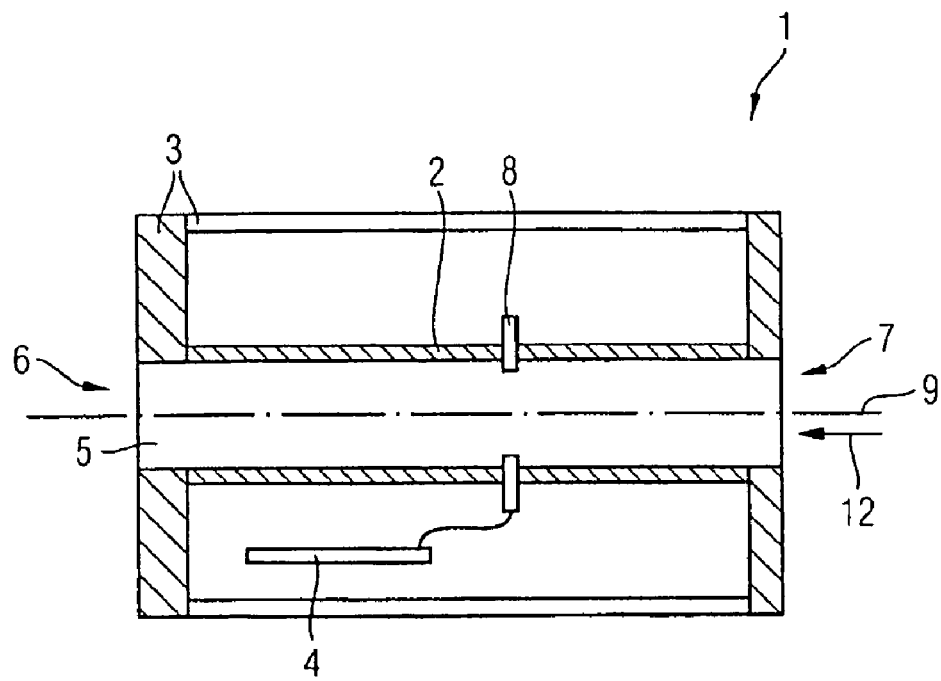
FIG. 1 shows a first exemplary embodiment of the flowmeter device according to the invention.

FIG. 1 shows a schematic cross section of a first, very general exemplary embodiment of the flowmeter device according to the invention. The flowmeter device is designated by reference symbol 1. In the exemplary embodiment illustrated, the flowmeter device 1 is illustrated in rotationally symmetrical fashion with respect to a longitudinal axis 9. It is evident, however, that this is not a feature that restricts the invention. A polygonal form of the housing 3 is also possible, of course.

An essential part of the flowmeter device 1 is the measuring tube 2, which has a throughflow channel 5 and through which the medium to be measured flows in the throughflow channel 5. The measuring tube 2 is enclosed by a housing 3, which is embodied here as a tubular housing jacket and which thus has a left-hand and a right-hand housing opening 6, 7, into which the measuring tube 2 can be introduced into the interior of the housing 3 during assembly.

Two measuring electrodes 8 lying opposite one another are provided on the measuring tube 2, at which electrodes—when a suitably aligned magnetic field is applied to the measuring tube 2—a signal can be tapped off. According to the invention, the flowmeter device 1 now has an evaluation device 4, which is arranged directly within the housing 3 and which takes up the signal tapped off, evaluates said signal and outputs the information about the flow of the medium in standardized form as an evaluation signal. Said evaluation signal can then be output via an internal or else external standardized interface (not illustrated here).

Figure 2:
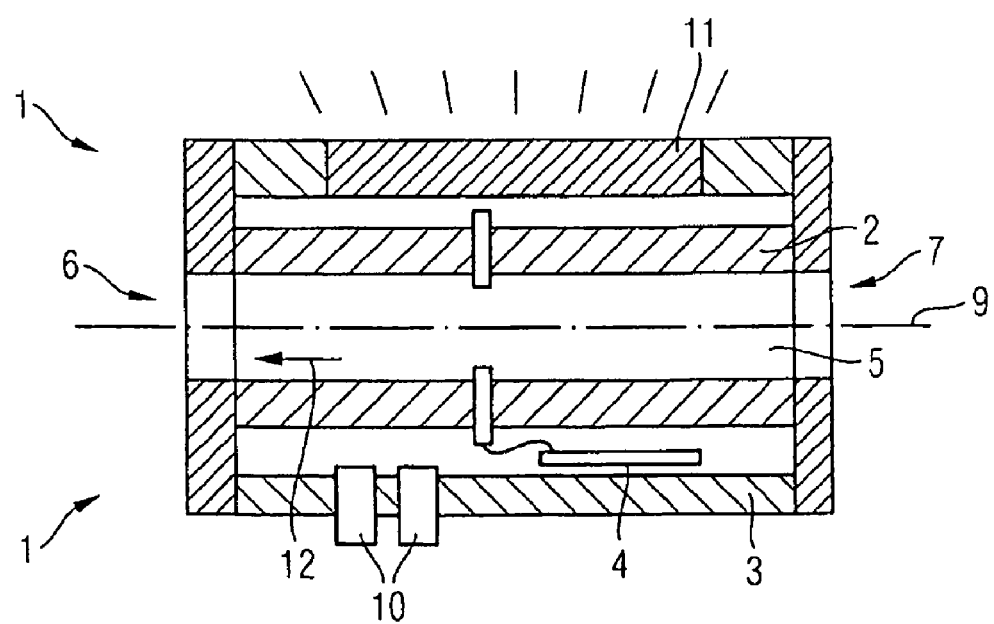
FIG. 2 shows a second exemplary embodiment of the flowmeter device according to the invention.

FIG. 2 shows a second general exemplary embodiment of the flowmeter device 1 according to the invention on the basis of a cross section. Here an operating device 10 and a display device 11 are respectively arranged in cutouts specially provided therefor. This will be discussed in even further detail later.

Figure 3:
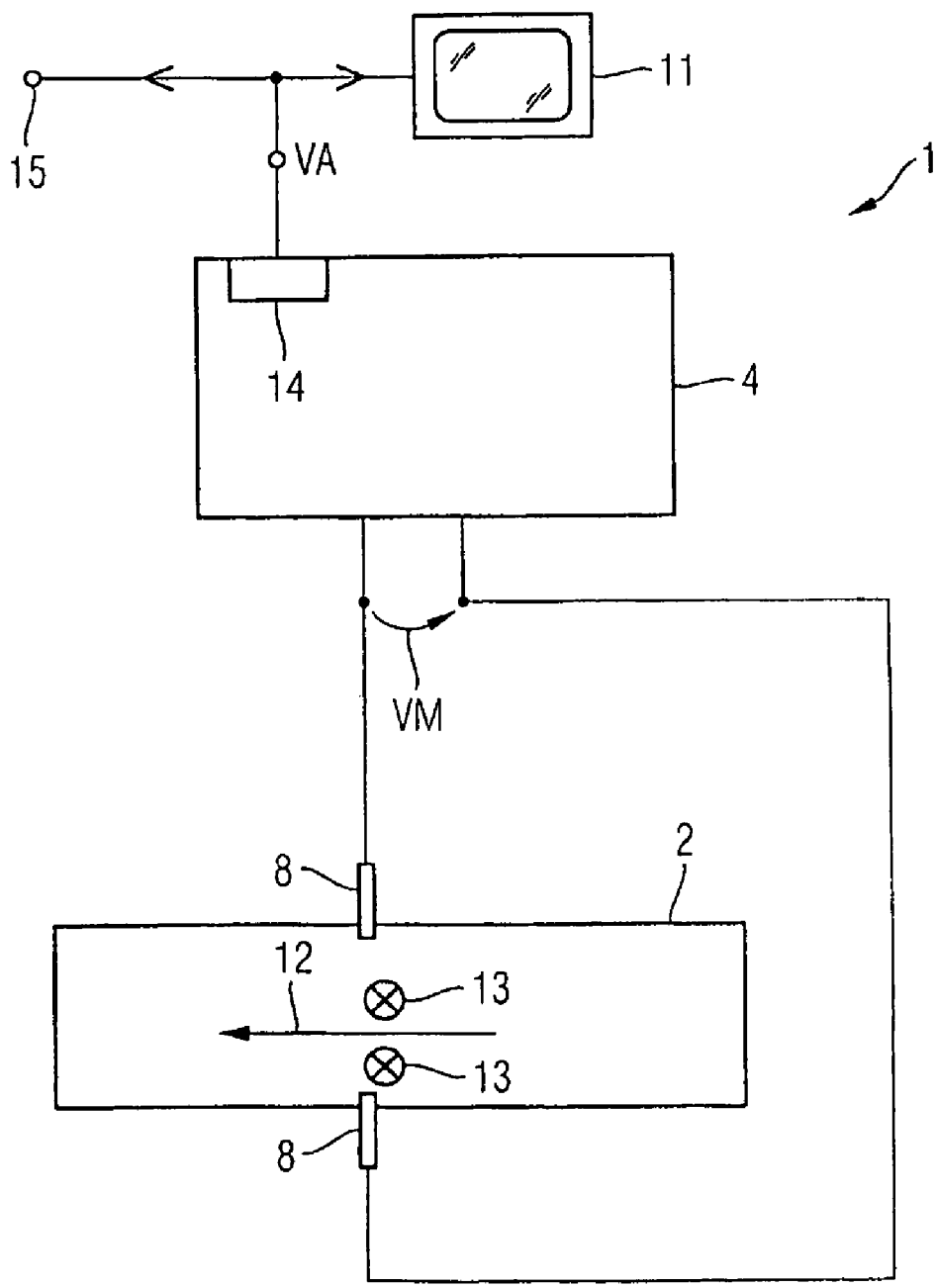
FIG. 3 shows a block diagram for illustrating the function of the flowmeter device according to the invention.

FIG. 3 shows the construction and the functioning of the flowmeter device according to the invention on the basis of a block diagram. Here the measuring tube 2 is permeated by a magnetic field 13 perpendicular to the flow direction 12 of the medium. A voltage is thereby induced between the two measuring electrodes 8, said voltage thus having information about the flow of the medium. This measurement voltage vm is fed to the evaluation device 4, which carries out the evaluation of the information contained in the measurement voltage VM.

In a manner dependent thereon, the evaluation device 4 generates an evaluation signal VA on the output side, which evaluation signal thus in turn has the information about the flow of the medium as recorded by means of the measuring electrodes 8. What is essential here is that the evaluation signal VA is present in standardized form, for example as an evaluation signal which is suitable for a PLC-based communication. This standardized evaluation signal VA is provided at an output interface 14, which can be embodied as an internal or else as an external interface. Said evaluation signal VA can then be fed to the display device 11 for the visual representation of the information contained therein. As an alternative or in addition, the evaluation signal can also be passed out via an external connection 15 toward the outside, that is to say outside the housing of the flowmeter device and be made available to other subscribers.

Figure 4A:
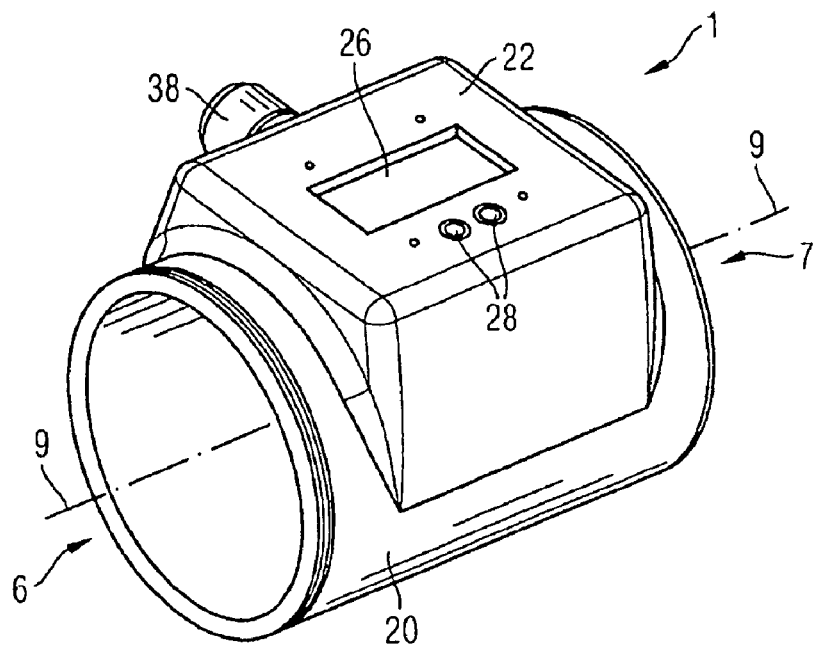
FIGS. 4A, 4B show a third and a fourth exemplary embodiment of the flowmeter device according to the invention on the basis of perspective illustrations.
Figure 4B:
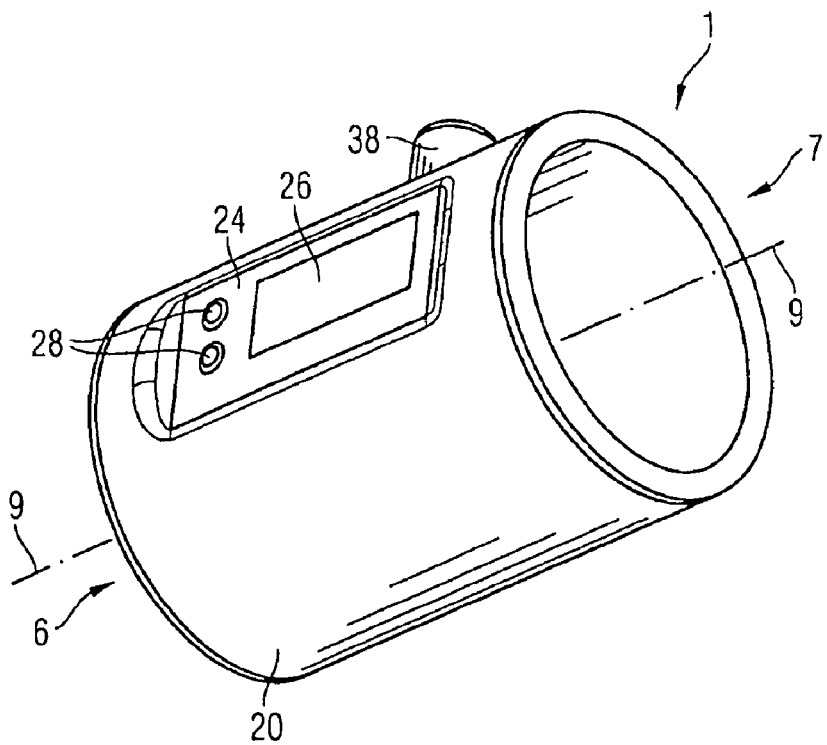

FIGS. 4A, 4B show a third and fourth exemplary embodiment of the flowmeter device according to the invention on the basis of perspective illustrations.

Here the housing has a substantially tubular housing jacket 20, which is made of high-grade steel, for example. The housing jacket 20 has a first housing opening 6, a second housing opening 7 and furthermore a longitudinal axis 9. In the first exemplary embodiment illustrated in FIG. 4A, the housing jacket 20 has a raised receptacle region 22. Said receptacle region 22 has a first cutout 26 and also two second cutouts 28. The display device 11, in particular in the form of a display, can be arranged in the first cutout. The second cutouts 28 serve to receive operating elements of a keyboard. Only two second cutouts for two keys are illustrated in the exemplary embodiment illustrated. It is clear, however, that a significantly larger number of second cutouts for receiving operating elements can be introduced into the raised receptacle region 22 if this is desired or they are required. A flowmeter device 1 having a housing jacket 20 embodied in this way is suitable in particular for flow measurement of media having a high temperature.

In the exemplary embodiment in FIG. 4B, the receptacle region 24 is fashioned in a recessed manner. This receptacle region 24 likewise has a first cutout 26 for the display device and also two second cutouts 28 for operating elements of the operating device 10. This embodiment of the housing jacket 3 is distinguished by its compactness.

Both housings in FIGS. 4A, 4B each have an external plug connection 38, which has a sleeve welded onto the housing jacket 20 and which is preferably embodied as a PLC socket. The housing jacket 20 of FIGS. 4A and 4B may be formed according to a variety of form factors, including tubular, cylindrical, prismatic, etc.

Figure 5A:
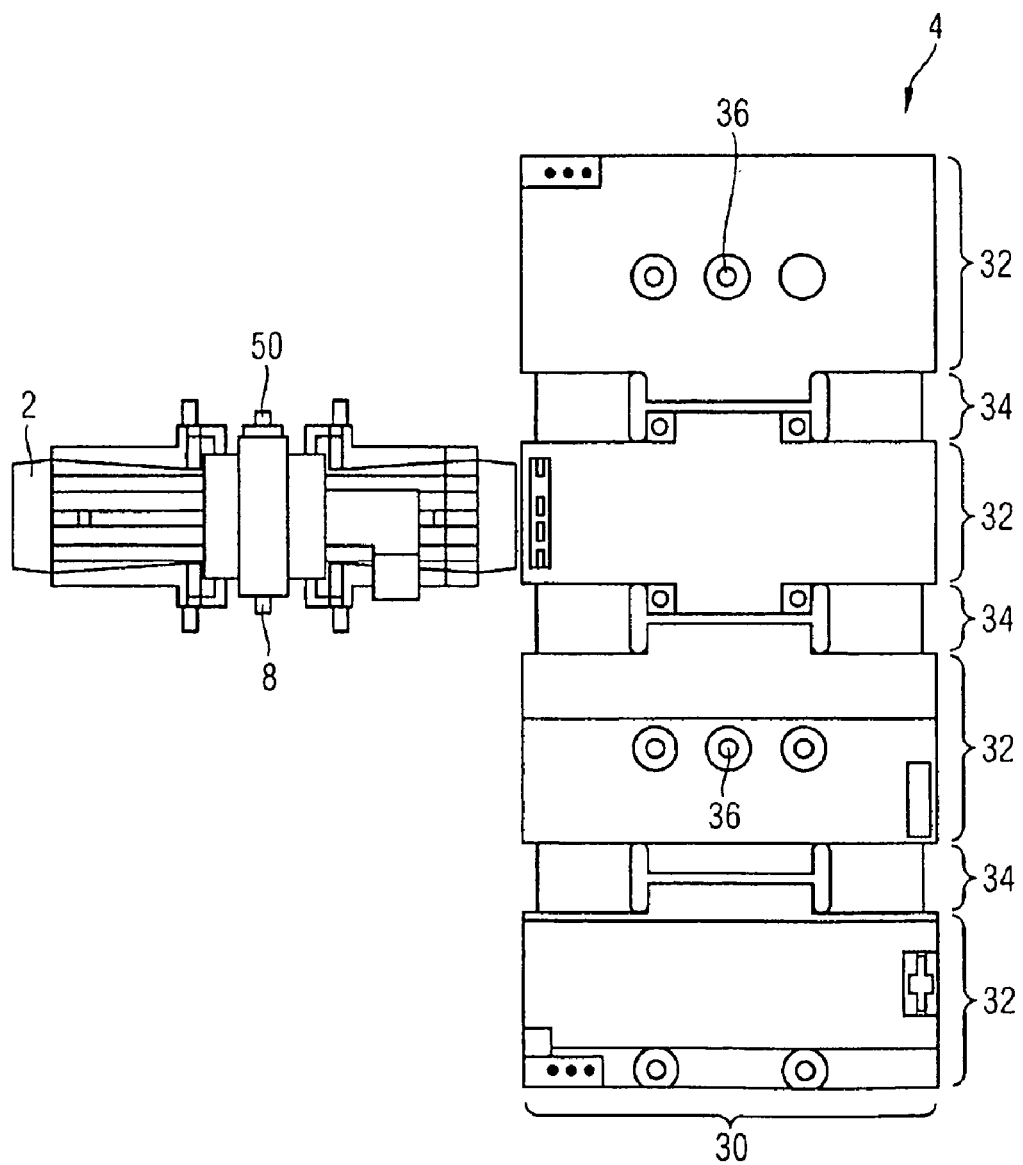
FIGS. 5A-5C show the measuring tube and the evaluation device in a disassembled and an assembled state.
Figure 5B:
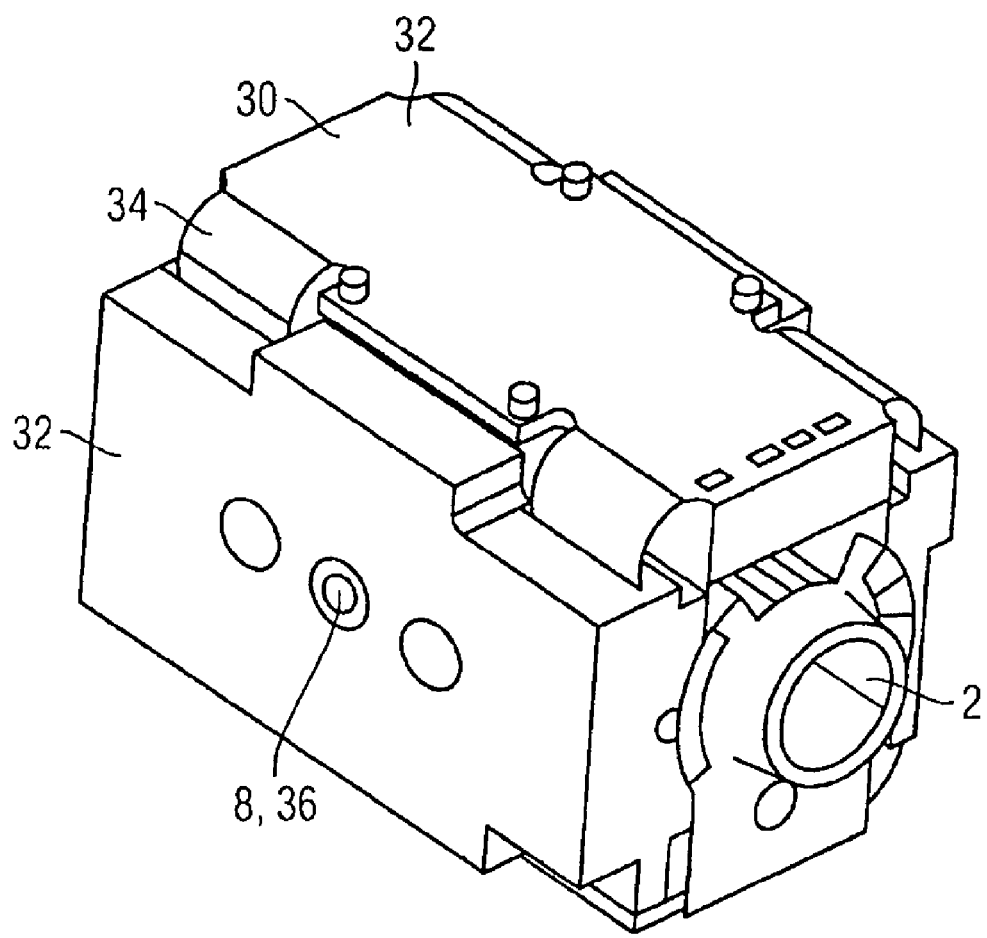
Figure 5C:
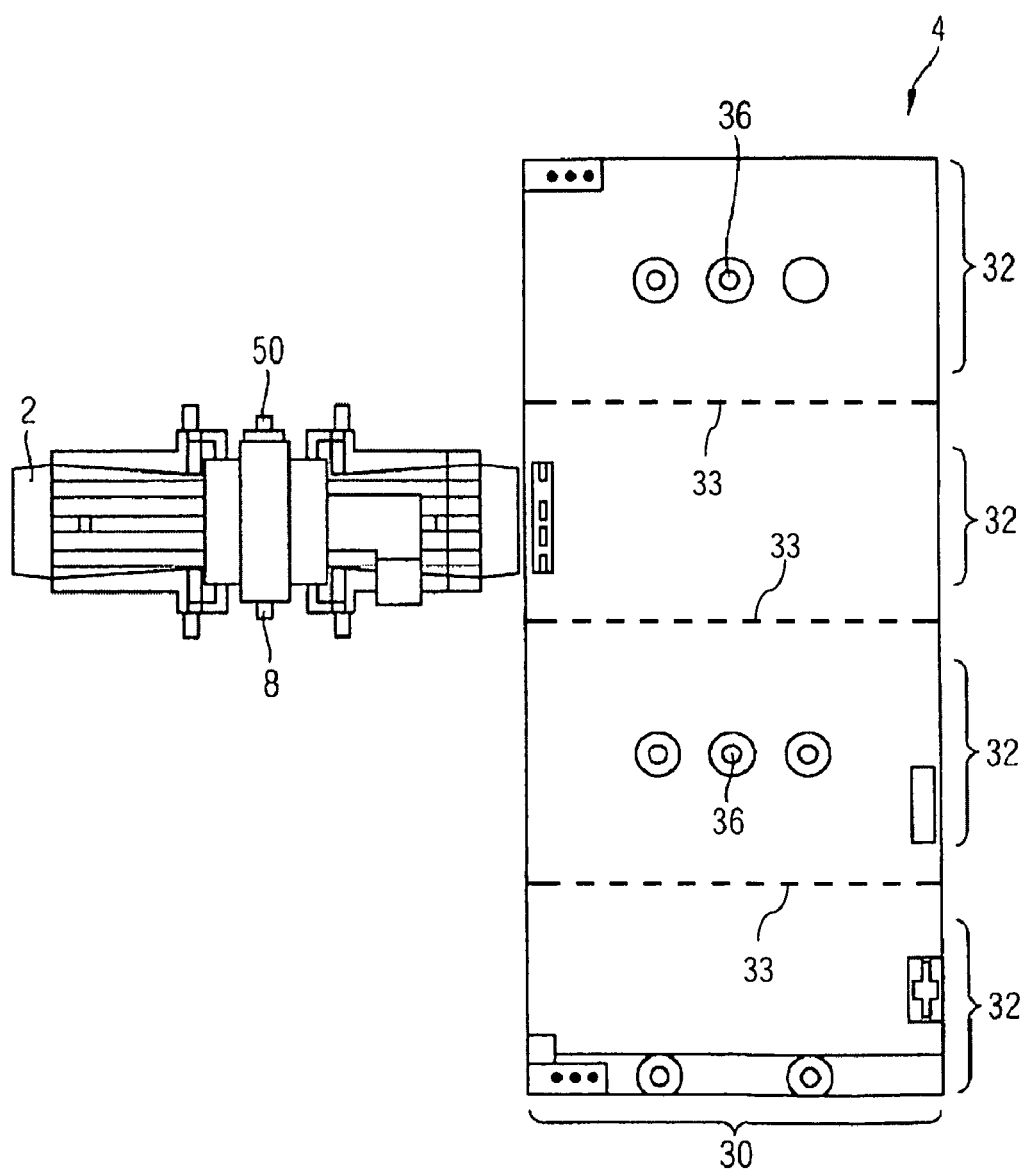

FIGS. 5A, 5B show the measuring tube and the evaluation device 4 in a disassembled and an assembled state for illustrating a preferred exemplary embodiment. The evaluation electronics 4 have a printed circuit board 30 (also designated as circuit boards) comprising typically rigid printed circuit board segments 32 and flexible sections 34. The elements are in this case arranged on said printed circuit board 30 even though this is not illustrated in FIG. 5A for the sake of better clarity. At said flexible sections 34, which can be embodied for example as a conductor film, the printed circuit board 30 can at least partly be folded. This makes it possible to fold the printed circuit board 30 and thus the evaluation electronics 4 around the measuring tube 2 in such a way that they at least partly enclose the measuring tube 2. The measuring tube 2 enclosed by the printed circuit board 30 and thus the evaluation electronics 4 is illustrated in FIG. 5B. Such an arrangement can be regarded as markedly compact and space-saving. An alternative embodiment shown in FIG. 5C shows the printed circuit board including rigid printed board segments 34 and grooved incision or a thinned portion (represented by dashed line 33) of the printed circuit board 30 is provided between two adjacent printed circuit board segments 34 in such a way that the printed circuit board 30 is embodied to be at least partly flexible at that location. In other words, a printed circuit board 30 including grooved incisions, thinned portions, or flexible portions, or any combination thereof may permit the printed circuit board to bend relative to the remaining regions (e.g., rigid printed board segments 34) of the printed circuit board 30.

One particular advantage also consists in the fact that such folding makes it possible to produce an electrical contact-connection of adjacent printed circuit board segments 32 between the measuring electrodes 8 of the measuring tube 2 and the evaluation electronics 4. For this purpose, during the mounting of the evaluation electronics, the measuring electrodes 8 are introduced into the holes 36 in the rigid printed circuit board segments 32, which have e.g. an electrically conductive surface and which are furthermore electrically connected to the evaluation electronics. Consequently, a separate electrical contact-connection, e.g. by means of a soldering connection, is not necessary.

FIGS. 6A-6D show the flowmeter device 1 according to the invention in accordance with a further preferred exemplary embodiment. As can be seen from the isometric view from FIG. 6A, the housing jacket 20 has a raised receptacle region 22. A sheet 42 is arranged in the first cutout 26 in said receptacle region 22. A screen 40 is situated on the sheet 42 inside the housing, which screen is visible and can be read well externally. Said screen 40 is protected against ambient influences by the sheet 42 arranged in the first cutout 26. Furthermore, the receptacle region 22 has second Cutouts 28, in which operating elements 44 are arranged.

21 here designates the threaded connector covers that are connected to the housing jacket 20 on both sides.

Figure 6A:
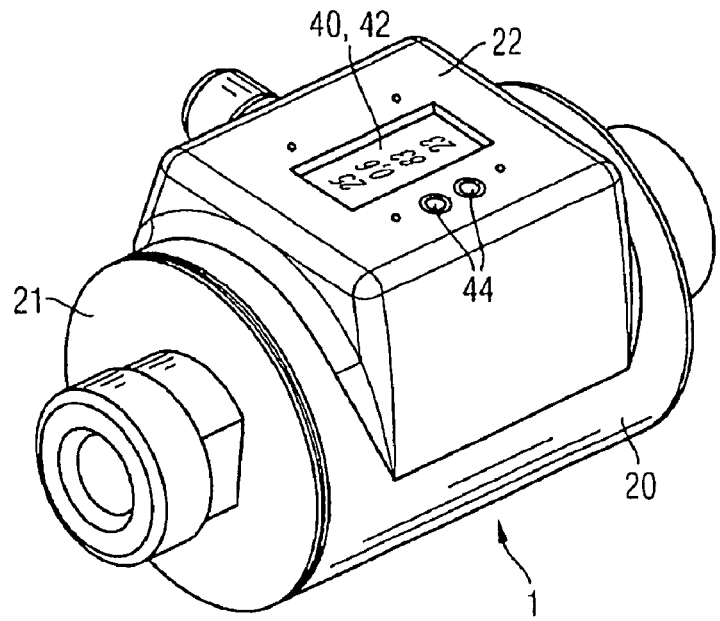
Figure 6B:
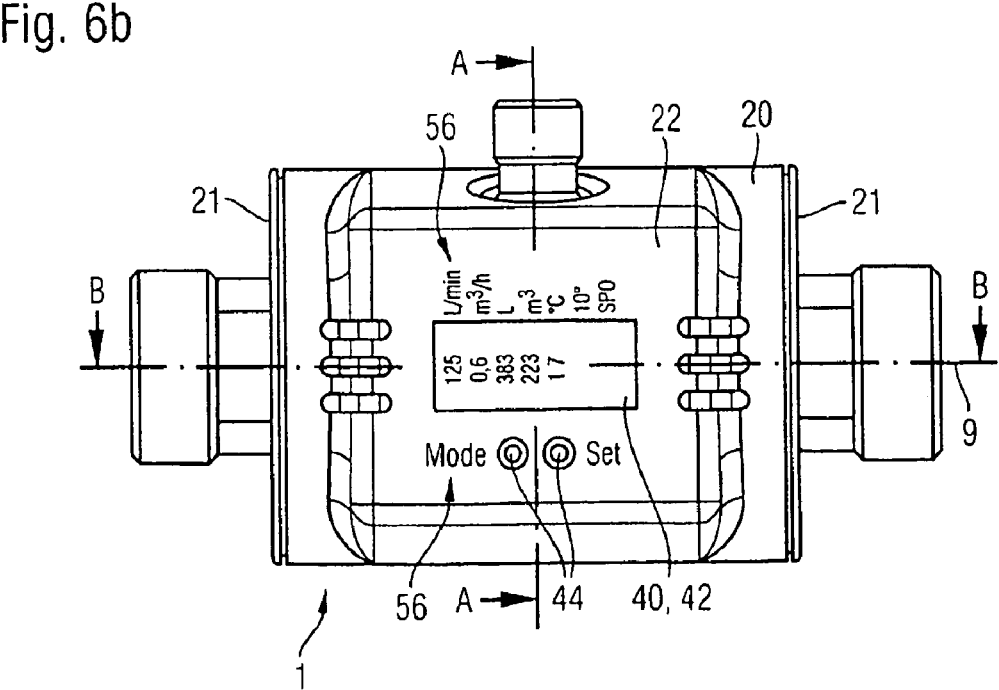

FIG. 6B shows the flowmeter device 1 in accordance with the same preferred exemplary embodiment from FIG. 6A. An inscription 56 explaining the values that can be represented by the screen 40 is applied in the region of the first cutout 26 in the raised receptacle region 22. Such an inscription can be introduced into the housing e.g. with the aid of lasers or stamping tools. An inscription 56 is likewise situated in the region of the operating elements 44, This inscription 56 serve, e.g. to elucidate the functions that can be selected by means of the operating elements.

FIGS. 6C, 6D show the flowmeter device 1 according to the invention in accordance with the preferred exemplary embodiment from FIGS. 6A, 6B in a sectional view longitudinally and transversely with respect to the flowmeter device 1. The measuring tube 2 is arranged approximately centrally in the flowmeter device 1. A magnetic field generating device 48 comprising an upper part and lower part and also two measuring electrodes 8 are situated on said measuring tube 2. The measuring electrodes 8 are preferably arranged perpendicular to the flow direction and to the magnetic field that can be generated by the magnetic field generating device 48. The measuring electrodes 8 and the magnetic field generating device 48 are electrically connected to the evaluation electronics 4.

The voltage value tapped off at the measuring electrodes 8 is converted into an equivalent flow rate of the medium in the evaluation electronics 4. This information is subsequently communicated in the form of the standardized evaluation signal VA to the drive device 46 of the display device 4. Said drive device 46 is mechanically connected to the housing jacket 20 by means of a fixing device and also a positioning device 54. The drive device 46 is furthermore electrically connected to the screen 40, on which the measurement values are displayed. Said screen 40 is arranged on the sheet 42 within the housing jacket 20. The displayed values can be read well externally through said sheet 42. To a certain extent the screen 40 is also well protected by said sheet 42.

FIGS. 6A-6D furthermore reveal the arrangement of the evaluation electronics 4 within the housing jacket 20, wherein the evaluation electronics 4 comprise both rigid printed circuit board segments 32 and flexible sections 34. By virtue of this particular construction of the evaluation electronics 4, the latter can be folded and can be arranged in the housing jacket 3 in such a way that they enclose the measuring tube 2. This arrangement of the evaluation electronics 4 has even further advantages with respect to a realization by means of conductor film (so-called flexiprint). Through the combination of rigid printed circuit board segments 32 and flexible sections (conductor films with conductor tracks) which produce electrical connections between the individual printed circuit board segments 32, assembly is simplified since there is no need for any carriers whatsoever for the connecting lines or conductor tracks. The combination also makes it possible to realize more complex forms such as e.g. with 5-, 6-, 7-, 8- or 9-gonal cross sections.

The printed circuit boards also permit a higher integration density than conductor films since they can be populated on their front and rear sides. Moreover, such printed circuit boards can be populated in multilayer fashion, which in particular enables short connections in the case of signal paths sensitive to interference signals. The sensitive signal paths can be provided in interlayers, where e.g. a shielding device is already present. In a particularly advantageous manner, the sensitive signal paths are restricted to the rigid, inflexible regions of the printed circuit board, that is to say e.g. to the printed circuit board segments 32. The shielding against interference signals by means of ground shields on the rear side of printed circuit boards can also be realized very simply in this way.

Furthermore, it can be seen from FIG. 6D that an operating element 44 is likewise connected to the drive device 46. The required drive device 46 for operating such an operating element 44 is therefore likewise arranged within the housing jacket 20 and protected against ambient influences. By means of such an operating element 44, it is possible e.g. to switch over between different measurement values to be displayed.

Figure 7A:
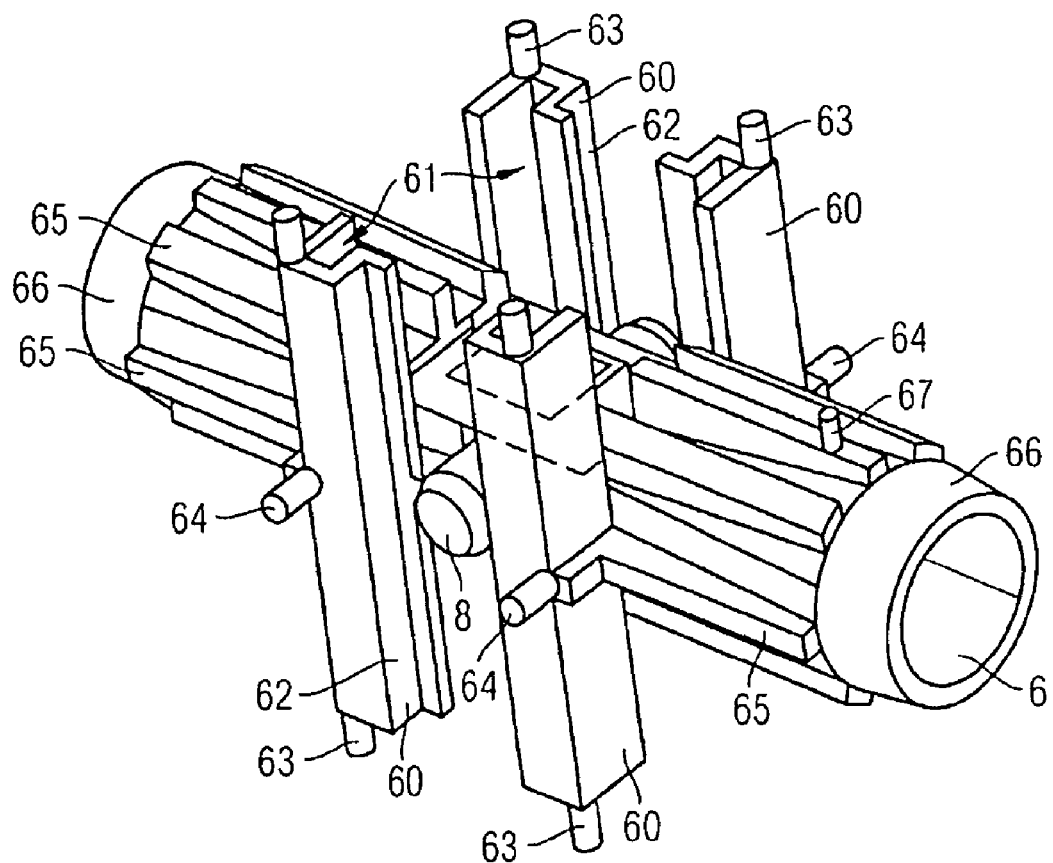
FIGS. 7A-7C show the measuring tube and magnetic field generating device arranged thereon.
Figure 7B:
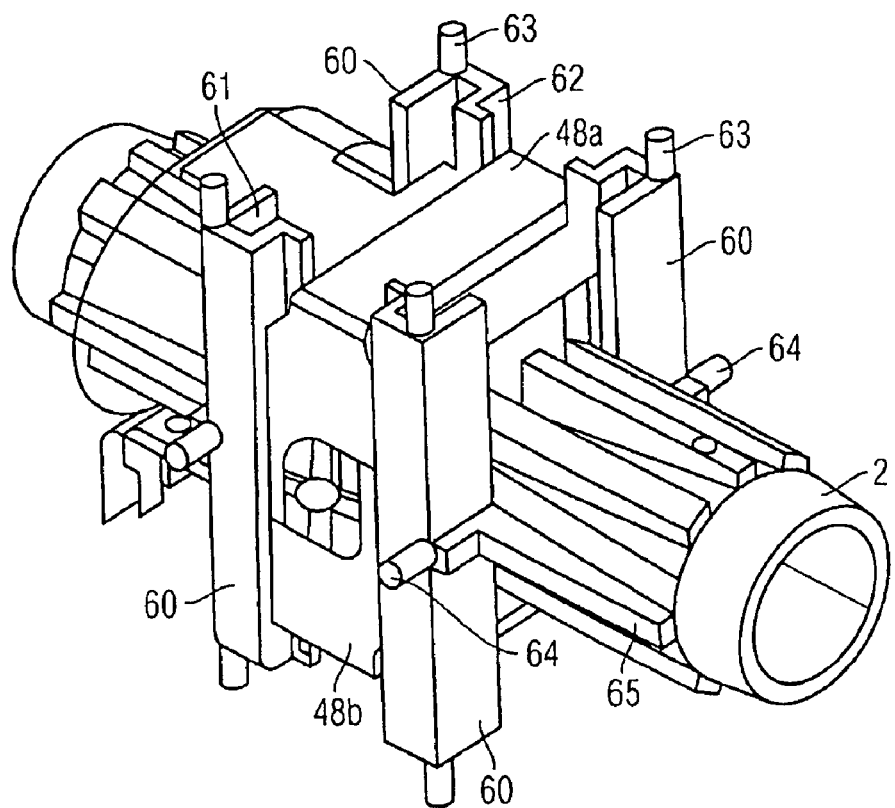

FIGS. 7A, 7B show the measuring device and magnetic field generating device 48 arranged thereon. In a longitudinal direction, the measuring tube 2 has a measuring channel 5 having a measuring cross section, wherein the measuring cross section is oriented perpendicular to the flow direction of the medium, In addition, the cross section of the measuring channel 5 decreases from the measuring tube ends in the direction of the measuring cross section. As a result of this reduction of the cross-sectional area, an acceleration of the medium toward the measuring cross section is achieved and a higher signal voltage can be tapped off.

In order to be able to tap off a highest possible signal voltage, the measuring electrodes 8 are arranged in a manner lying opposite one another and perpendicular to the flow direction of the medium. Furthermore, the measuring electrodes 8 in the measuring channel 5 are in contact with the medium flowing through. The measuring electrodes penetrate through the measuring tube wall and are electrically contact-connected outside the measuring tube in order to tap off the induced voltage dependent on the flow rate. Electrical contact-connection is possible e.g. by means of soldering with a wire. As an alternative, the measuring electrode 8 can at least partly have a thread and the electrical contact-connection is effected by means of a screw connection. Furthermore, the measuring tube 2 has guide means 60 integrally formed on its outer side.

In the preferred exemplary embodiment illustrated, said guide means are embodied as guide rails. Said guide rails are arranged parallel to one another and integrally formed tangentially on the measuring tube 2. As a result of this type of arrangement of the guide means 60, a magnetic field generating device 48 can be moved perpendicularly with respect to the measuring tube 2. In order to guide this movement of the magnetic field generating device 48, the guide means 60 have inner longitudinal grooves 61 and/or outer longitudinal grooves 62.

Depending on the embodiment of the magnetic field generating device, guidance is performed by the inner longitudinal grooves and/or the outer longitudinal grooves, the magnetic field generating device in its end position being situated in very close proximity to the measuring cross section. It is evident that the guide means 60 do not necessarily have to be embodied as guide rails. The guide means can likewise be embodied in wall-type fashion, in which case the guide rails illustrated would form virtually the corner pillars of the wall-type guide means. The wall-type guide means give rise to a container having an opening on the side facing away from the measuring tube, through which a magnetic field generating device can be inserted.

The guide means 60 furthermore have first positioning elements 63. In the preferred exemplary embodiment illustrated, said first positioning elements 63 are embodied as positioning lugs and arranged at the longitudinal ends of the guide means 60. The positioning lugs 63 make it possible to position the measuring device with respect to surrounding components such as e.g. a printed circuit board and/or a housing.

Depending on the embodiment of the positioning lugs and the respective hole around the surrounding component, into which these are introduced (not illustrated), either a positioning (clearance fit) and/or a fixing (press fit) with respect to the surrounding components can be effected. The same corresponding applies to the second positioning elements 64. In the preferred exemplary embodiment illustrated, said second positioning elements are likewise embodied as positioning lugs arranged at the guide means in such a way that said second positioning elements 64 are oriented perpendicularly with respect to the first positioning elements 63. A positioning and/or a fixing with respect to surrounding components is likewise possible by means of said second positioning lugs 64.

Furthermore, in the preferred exemplary embodiment illustrated, the measuring tube 2 has ribs 65 running in an axial direction, for increasing the strength of the measuring tube 2. It is evident, however, that said ribs 65 can be embodied not necessarily as longitudinal ribs but rather likewise as circumferential ribs or as a combination of longitudinal ribs and circumferential ribs.

Furthermore, the measuring tube ends 66 are embodied in such a way that surrounding components, such as e.g. further tube elements, can be fitted to them. In the preferred exemplary embodiment illustrated, the measuring tube ends 66 are fashioned in the form of connectors. By virtue of this connector form, simple linking to further tube elements both upstream and downstream of the measuring device is possible. It is evident that the measuring tube ends 66 do not have to be embodied in the form of connectors, rather other connection embodiments such as e.g. flanges or the like are likewise possible.

The measuring tube 2 additionally has a hole with a temperature sensor 67 arranged therein. By means of the temperature sensor 67, over and above the detection of the flow rate, it is possible to detect its temperature.

Figure 7C:
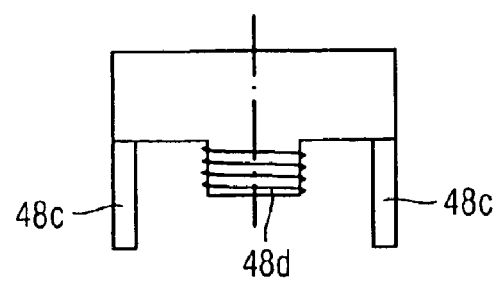

FIG. 7B shows a perspective view of the measuring tube from FIG. 7A, the magnetic field generating device here being illustrated in a state mounted on the measuring tube 2. The magnetic field generating device 48 comprises an upper part 48a and also a lower part 48b. As illustrated in a front view in FIG. 7C, the upper part 48a and the lower part 48b have two pole shoes 48c and also a wound core 48d. The pole shoes 48c are fashioned in the form of pins. Both the upper part 48a and the lower part 48b can be pushed into the guide rails 60 in the direction of the measuring tube 2. The upper part 48a and the lower part 48b are respectively guided by the outer longitudinal grooves made on the guide means.

LIST OF REFERENCE SYMBOLS

1 Flowmeter device
2 Measuring tube
3 Housing
4 Evaluation device
5 Throughflow channel
6 First housing opening (inlet)
7 Second housing opening (outlet)
8 Measuring electrodes
9 Longitudinal axis
10 Operating device
11 Display device
12 Flow direction
13 Magnetic field
14 Output interface
15 External connection
20 Housing jacket
21 Threaded connector cover
22 Receptacle region
24 Receptacle region
26 First cutout (display)
28 Second cutout (operating elements)
30 Printed circuit board, circuit board
32 Printed circuit board segments
34 Flexible sections, conductor film
36 Contact-connection for measuring electrode
40 Screen
42 Sheet
44 Operating elements
46 Drive device
48 Magnetic field generating device
48a Upper part
48b Lower part
48c Pole shoes
48d Wound core
52 Fixing device
54 Positioning device
56 Inscription
60 Guide means, guide rails
61, 62 Longitudinal grooves
63, 64 Positioning elements
65 Ribs
66 Measuring tube ends
67 Temperature sensor
VA Standardized evaluation signal
VM Measurement voltage

What is claimed is:

1. A flowmeter device,
comprising a measuring tube, through which the medium to be measured flows,
comprising a tubular housing, within which the measuring tube is arranged,
comprising a magnetic inductive flowmeter including an evaluation device, which is arranged within the housing and in proximity to a measurement location, the evaluation device being configured to evaluate a flow measurement value for the medium recorded by the magnetic inductive flowmeter and, in a manner dependent thereon, generate in a standardized form an evaluation signal containing information about the recorded flow measurement values.

2. The flowmeter device as claimed in claim 1, wherein the evaluation device has a standardized digital output interface arranged within the housing, at which interface a digital or binary coded evaluation signal can be tapped off, which contains the flow measurement value directly or contains information derived from the flow measurement value.

3. The flowmeter device as claimed in claim 1, wherein the evaluation device has integrated evaluation electronics embodied as a program-controlled device.

4. The flowmeter device as claimed in claim 1, wherein the evaluation device has evaluation electronics, in the case of which discrete components are provided for the evaluation electronics, said components being arranged on a printed circuit board and electrically contact-connected there.

5. The flowmeter device as claimed in claim 1, wherein the evaluation device has a storage device, in which measuring tube characteristic data with regard to the dimensions and properties of the measuring tube can be stored.

6. The flowmeter device as claimed in claim 1, wherein a display device for directly displaying the information provided by the evaluation device is provided, which is arranged directly in the housing.

7. The flowmeter device as claimed in claim 1, wherein the flowmeter device has an operating device arranged in a second cutout in the housing, within which one or more operating elements are arranged.

8. The flowmeter device as claimed in claim 1, wherein there is provided on the housing at least one plug connection via which control signals can be coupled into the flowmeter device externally and via which control and evaluation signals can be tapped off from the flowmeter device externally.

9. The flowmeter device as claimed in claim 1, wherein a single external connection is provided, which contains a supply connection and a plug connection.

10. The flowmeter device as claimed in claim 1, wherein the measuring tube has two measuring electrodes arranged on the measuring tube in a manner lying opposite one another and perpendicular to a magnetic field generated in the measuring tube and/or perpendicular to the flow direction of the medium, wherein the measuring electrodes are electrically connected directly to the evaluation device.

11. The flowmeter device as claimed in claim 1, wherein provision is made of at least one temperature sensor for measuring the temperature of the medium.

12. The flowmeter device as claimed in claim 1, wherein the housing has an integral tubular housing jacket embodied in cylindrical or prismatic fashion at least in sections.

13. The flowmeter device as claimed in claim 12, wherein the housing jacket has an opening in each case on both sides, wherein the cross-sectional areas of the openings substantially correspond to the cross-sectional areas in the remaining region of the housing jacket along the longitudinal axis thereof.

14. The flowmeter device of claim 1,
wherein the evaluation device is completely arranged within the housing and externally to the measuring tube.

15. A flowmeter device,
comprising a measuring tube, through which the medium to be measured flows,
comprising a tubular housing, within which the measuring tube is arranged,
comprising a magnetic inductive flowmeter including an evaluation device, which is arranged within the housing, wherein the evaluation device is arranged at least partly on a printed circuit board and is designed to evaluate information about the medium to be measured, said information being recorded by the magnetic inductive flowmeter proximate the measuring tube, wherein the printed circuit board has at least two printed circuit board segments which are connected to one another via flexible conductor film sections having conductor tracks.

16. The flowmeter device as claimed in claim 15, wherein the printed circuit board is embodied such that it is partly flexible or fully flexible.

17. The flowmeter device as claimed in claim 15, wherein the printed circuit board has at least two printed circuit board segments embodied in inflexible fashion.

18. The flowmeter device as claimed in claim 15, wherein at least one of the printed circuit board segments is embodied as a multilayer printed circuit board having at least one layer which is electrically conductive.

19. The flowmeter device as claimed in claim 18, wherein the multilayer printed circuit board has an electrically conductive shielding device for shielding undesirable interference signals that are coupled in and/or at least one conductor track.

20. The flowmeter device as claimed in claim 15, wherein a grooved incision or thinned portion of the printed circuit board is provided between two adjacent printed circuit board segments in such a way that the printed circuit board is embodied such that it is at least partly flexible at this location.

21. The flowmeter device as claimed in claim 15, wherein the printed circuit board at least partly encloses the measuring tube in the radial direction thereof.

22. The flowmeter device of claim 15,
wherein the evaluation device is completely arranged within the housing and externally to the measuring tube.

* * * * *